US011233315B2

(12) United States Patent
Sivanandan et al.

(10) Patent No.: US 11,233,315 B2
(45) Date of Patent: Jan. 25, 2022

(54) PRE-ASSEMBLED CELL SITE SECTOR

(71) Applicant: CommScope Technologies LLC, Hickory, NC (US)

(72) Inventors: Deepak Kumar Sivanandan, Mckinney, TX (US); Ronald J. Bianchi, Frankfort, IL (US); Walter Mark Hendrix, Richardson, TX (US)

(73) Assignee: CommScope Technologies LLC, Hickory, NC (US)

( * ) Notice: Subject to any disclaimer, the term of this patent is extended or adjusted under 35 U.S.C. 154(b) by 994 days.

(21) Appl. No.: 15/188,335

(22) Filed: Jun. 21, 2016

(65) Prior Publication Data
US 2016/0302078 A1 Oct. 13, 2016

Related U.S. Application Data

(63) Continuation of application No. 15/106,737, filed as application No. PCT/US2014/071640 on Dec. 19, 2014.
(Continued)

(51) Int. Cl.
*H01Q 1/24* (2006.01)
*H01Q 1/12* (2006.01)
(Continued)

(52) U.S. Cl.
CPC ............ *H01Q 1/246* (2013.01); *H01Q 1/1228* (2013.01); *H01Q 1/1242* (2013.01); *H04W 16/18* (2013.01); *H04W 88/08* (2013.01)

(58) Field of Classification Search
CPC .... H01Q 1/246; H01Q 1/1228; H01Q 1/1242; H04W 16/18; H04W 88/08;
(Continued)

(56) References Cited

U.S. PATENT DOCUMENTS 3,875,573 A 4/1975 Bueckert
4,295,431 A * 10/1981 Stavlo .................... B65D 19/08
108/55.1

(Continued)

FOREIGN PATENT DOCUMENTS

JP 2004357249 12/2004
KR 20060018516 3/2006
WO WO 2010/045979 A1 4/2010

OTHER PUBLICATIONS

Office Action corresponding to Chinese Application No. 201480069600.1 dated Feb. 24, 2018.
(Continued)

*Primary Examiner* — Basil S Katcheves
*Assistant Examiner* — Omar F Hijaz
(74) *Attorney, Agent, or Firm* — Myers Bigel, P.A.

(57) ABSTRACT

A pre-assembled cell sector radio assembly, which may be assembled and tested prior to shipment to the field, is provided. A cell sector radio assembly includes a frame, the frame including a first vertical frame element and a plurality of equipment mounts welded to the first vertical frame element; at least one cellular base station antenna mounted on the frame; at least one cellular radio, mounted on one of the plurality of equipment mounts; and RF cables connecting the cellular radio to the cellular base station antenna. The pre-assembled cell sector radio assembly may further include a backhaul termination (such as optical fiber) and power distribution unit mounted on one of the plurality of equipment mounts, and/or a filter unit mounted on one of the plurality of equipment mounts.

10 Claims, 17 Drawing Sheets

Related U.S. Application Data

(60) Provisional application No. 61/919,736, filed on Dec. 21, 2013, provisional application No. 61/919,737, filed on Dec. 21, 2013.

(51) Int. Cl.
*H04W 16/18* (2009.01)
*H04W 88/08* (2009.01)

(58) Field of Classification Search
CPC ........... A47B 47/0083; A47B 47/028; A47B 81/064; A47B 96/068; A47B 2200/0076
See application file for complete search history.

(56) References Cited

U.S. PATENT DOCUMENTS

| | | | |
|---|---|---|---|
| 4,671,418 A | 6/1987 | Muller et al. | |
| 5,626,231 A | 5/1997 | Kwong et al. | |
| 5,787,649 A | 8/1998 | Popowych et al. | |
| D430,378 S | 8/2000 | Worsoe | |
| 6,123,400 A * | 9/2000 | Nicolai | H02B 1/301 312/265.1 |
| 6,340,141 B1 * | 1/2002 | Rinderer | H02G 3/0456 211/26 |
| 6,926,243 B1 * | 8/2005 | Ziaylek | A62B 25/00 248/307 |
| 8,593,370 B2 | 11/2013 | Caldwell et al. | |
| 9,032,677 B1 | 5/2015 | Zavitz | |
| 9,814,644 B2 | 11/2017 | Clark et al. | |
| 2005/0250545 A1 | 11/2005 | Parker et al. | |
| 2006/0156675 A1 | 7/2006 | Nelson | |
| 2006/0266726 A1 | 11/2006 | Swanson | |
| 2007/0257855 A1 | 11/2007 | Skalina et al. | |
| 2008/0130261 A1 * | 6/2008 | Dennes | H02G 3/30 361/826 |
| 2010/0259462 A1 | 10/2010 | Yeh | |
| 2011/0271608 A1 * | 11/2011 | Egan | F24S 30/422 52/122.1 |
| 2013/0214652 A1 | 8/2013 | Mathewson | |
| 2014/0160713 A1 * | 6/2014 | Eguchi | H05K 7/1488 361/807 |
| 2014/0179244 A1 | 6/2014 | Colapietro et al. | |

OTHER PUBLICATIONS

International Search Report and Written Opinion for corresponding PCT Application No. PCT/US2014/071640, dated Mar. 16, 2015, 11 pages.
Extended European Search Report corresponding to European Application No. 14871355.5 dated Jul. 20, 2017.

* cited by examiner

PRE-ASSEMBLED CELL SITE SECTOR

RELATED APPLICATIONS

This application is a continuation of U.S. patent application Ser. No. 15/106,737, filed Jun. 20, 2016, which is a 35 USC § 371 national phase application of PCT/US2014/071640, with an international filing date of Dec. 19, 2014, which claims priority to U.S. Provisional Patent Application No. 61/919,736 and U.S. Provisional Patent Application No. 61/919,737, both filed Dec. 21, 2013, and titled "Pre-Assembled Cell Site Sector" the entire disclosures of which are incorporated by reference.

FIELD OF THE INVENTION

The present inventions relate generally to wireless communications. In particular, they relate to improvements in wireless base station antenna and radio deployments.

BACKGROUND

One known wireless radio network system that may be mounted at the top of the tower comprises a remote radio head (RRH) and a separate antenna. These components are mounted in separate locations and are then cabled together using jumper cables to pass the radio frequency (RF) signal between them. Such an installation, when done on site, may involve complex and time consuming installations, and introduces opportunities for installation errors. For example, current installations require multiple jumper cables and multiple mounting kits/hardware. This involves substantial installation time (approximately 12-15 hours per site). In addition, doing this installation at the site outdoors in variable temperature and humidity conditions can adversely affect interconnect quality and overall system performance.

Typically, it is up to the installation team to determine a mounting method. For example, once the antenna and RRH are mounted at the tower top, it is up to the installer to cable and connect the components together correctly. The installer will need a schematic or wiring diagram to understand how such connections should be made. This introduces the possibility of installing cables at the wrong locations, installing cables of incorrect lengths, improperly assembling connectors to the jumper cables, or not engaging them correctly, or other installation errors.

SUMMARY

A frame for a cell sector radio assembly is provided herein. In one example, the frame includes a first vertical frame element, such as a pipe, a second vertical frame element, a plurality of equipment mounts disposed between the first vertical frame element and the second vertical frame element, and a lifting eye attached to a top-most equipment mount. Alternate examples of the frame include single-pole embodiments adapted for rooftop deployment. Such frames include a flange at the bottom of the pole and may omit the lifting eye. The equipment mounts may each comprise a welded structure comprising a top bar, a bottom bar, and a vertical web between the top bar and bottom bar.

The frame is most advantageously used as part of a pre-assembled cell sector radio assembly, which may be assembled and tested prior to shipment to the field. A cell sector radio assembly includes a frame, the frame including a first vertical frame element and a plurality of equipment mounts welded to the first vertical frame element; at least one cellular base station antenna mounted on the frame; at least one cellular radio, mounted on one of the plurality of equipment mounts; and RF cables connecting the cellular radio to the cellular base station antenna. The pre-assembled cell sector radio assembly may further include a backhaul termination (such as optical fiber) and power distribution unit mounted on one of the plurality of equipment mounts, and/or a filter unit mounted on one of the plurality of equipment mounts.

For tower top applications, the frame further comprises a second vertical frame element and the plurality of equipment mounts are disposed between the first vertical frame element and the second vertical frame element. For rooftop applications, a single vertical frame element may be used and the plurality of equipment mounts are disposed opposite each other on the first vertical frame element to reduce the height of the assembly.

BRIEF DESCRIPTION OF THE DRAWINGS

FIG. 11b is a perspective view of the mounting frame as implemented in FIG. 11a.

DESCRIPTION OF THE PREFERRED EMBODIMENTS

Figure 1:
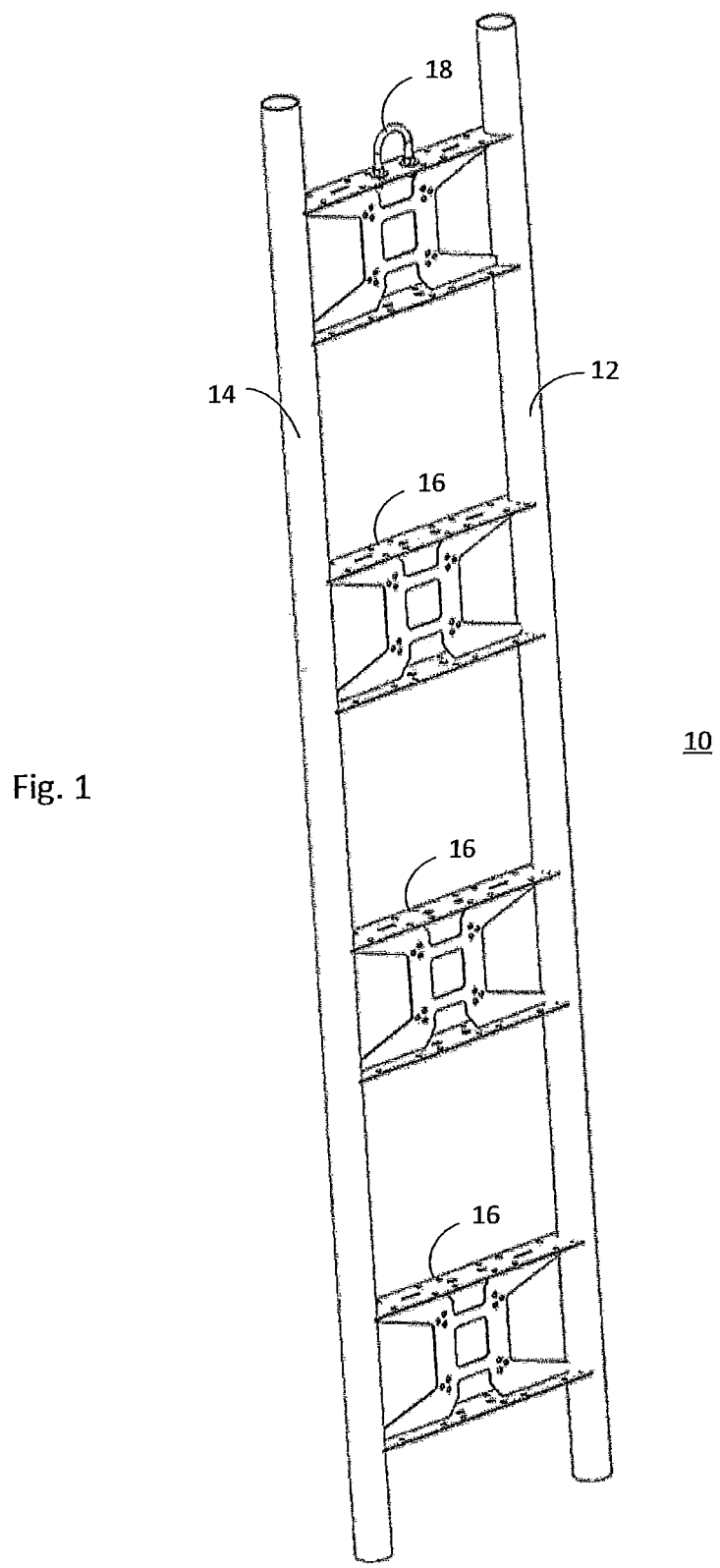
FIG. 1 is a perspective view of a mounting frame according to one example of the invention.

Referring to FIG. 1, one example of a mounting frame 10 according to the present invention is illustrated. The mounting frame 10 may comprise a first pipe 12, a second pipe 14, and a plurality of equipment mounts 16. A lifting eye 18 may also be included. Preferably, the equipment mounts 16 are configured to accommodate a wide variety of tower-mounted equipment.

The pipes 12, 14 may be approximately parallel to each other. While pipes are a preferred embodiment, other vertical members may be suitable. For example, square channels may be substituted for pipes 12, 14. The equipment mounts 16 are vertically spaced such that each item of tower-mounted equipment, such as a remote radio head, has adequate thermal ventilation. The spacing is also made to allow proper cable management and routing. The equipment mounts 16 are generic to accept radios from any manufacturer. In the illustrated example, four equipment mounts 16 are provided. This provides eight total mounting locations (one on either side of each equipment mount 16) to allow for expansion. Additional mounting brackets may be included to adapt an equipment mount 16 to any given remote radio head for mounting to the equipment mount 16.

The mounting frame 10 may comprise a welded steel structure. In particular, the equipment mounts 16 are welded structure which are then welded to pipes 12, 14. Preferably, the welds are continuous. Intermittent welds are not preferable due to severe corrosion environment. The welded construction is preferred because it is lighter weight than conventional mount frames made up of multiple components bolted together. The welded construction is also stronger than conventional frames with bolted connections. For example, the welded example illustrated herein may withstand up to 150 mph wind exposure. Additional lightweight materials (e.g., aluminum) may also be used for the mounting frame.

Figure 2:
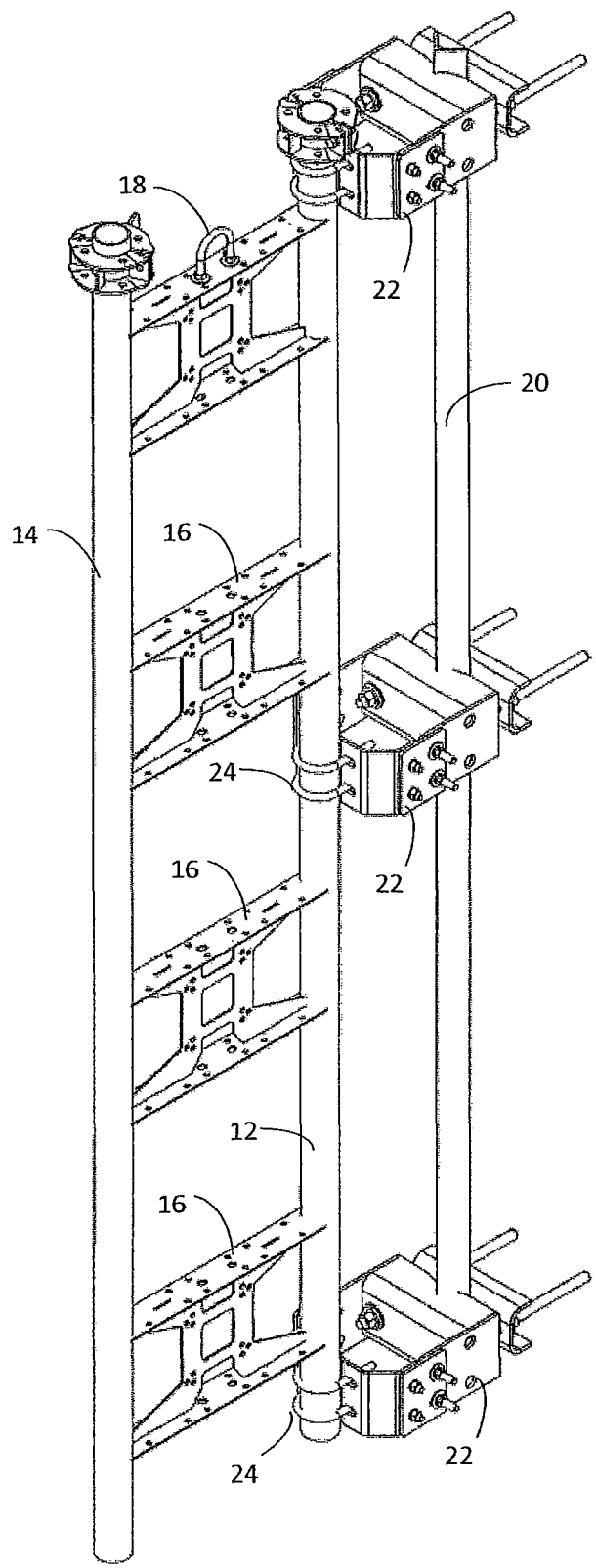
FIG. 2 is a perspective view of the mounting frame of FIG. 1 mounted to tower structure.
Figure 3:
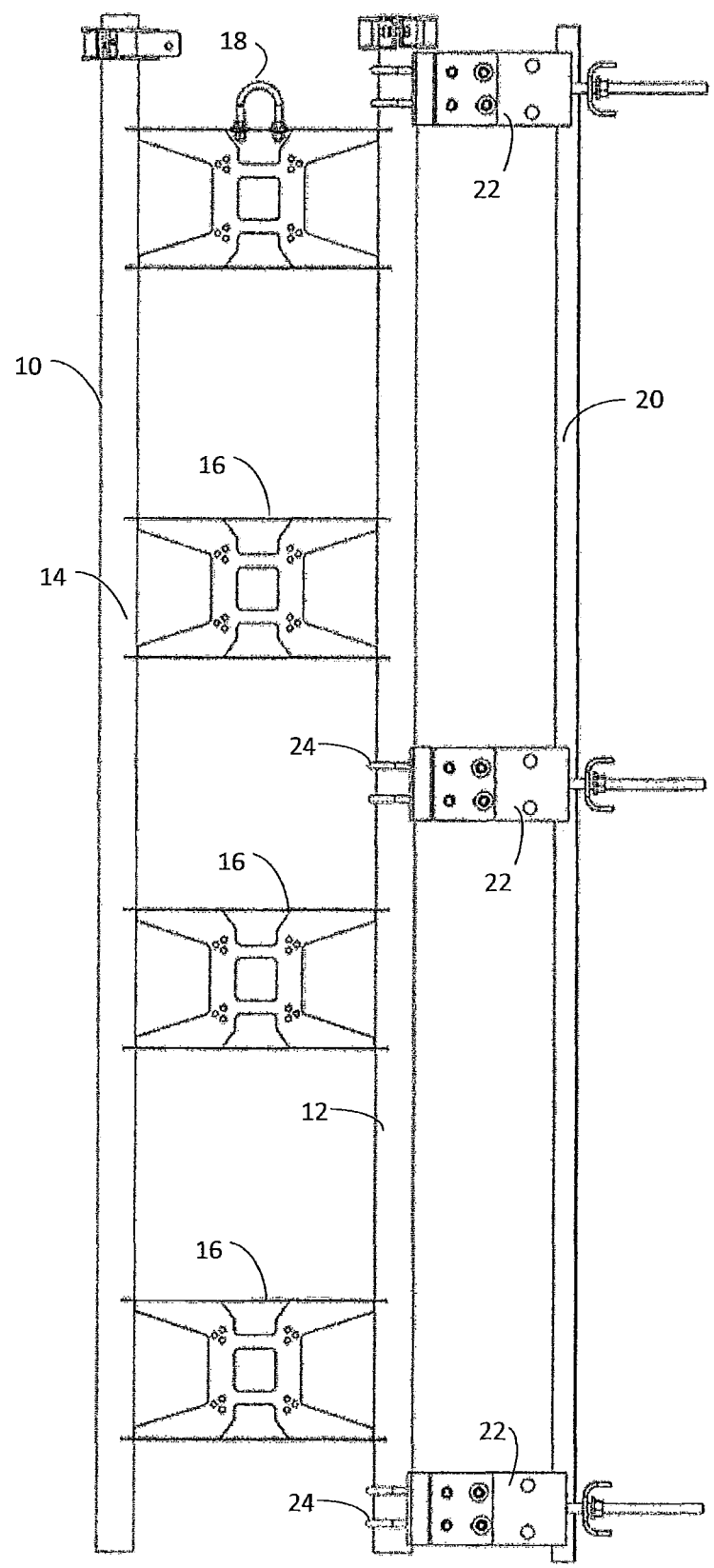
FIG. 3 is a side view of the mounting frame and tower structure of FIG. 2.

Referring to FIGS. 2 and 3, the mounting frame 10 may be installed on a frame structure 20 of a cell tower (not shown) by a plurality of universal, adjustable mounting brackets 22. The brackets 22 are adjustable so that the mounting frame may be mounted vertically, even if the tower structure 20 to which it is attached is angled with respect to vertical. The brackets 22 may be attached to pipe 12 of the mounting frame 10 with U-bolts 24. This allows azimuth panning the cell sector radio assembly with respect to a tower.

Figure 4:
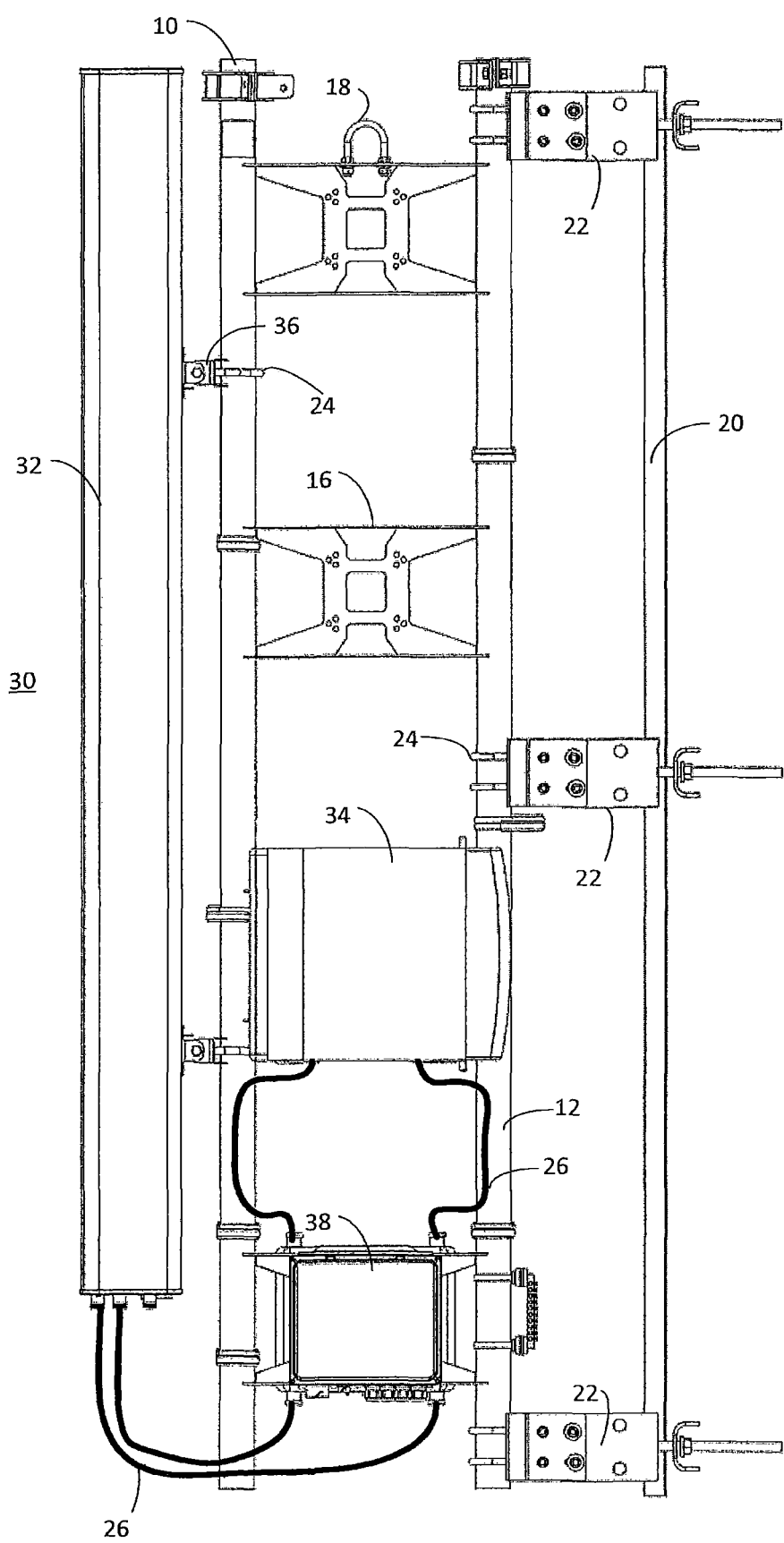
FIG. 4 is a side view of a first example of a cell sector radio assembly including the mounting frame of FIG. 1.
Figure 5:
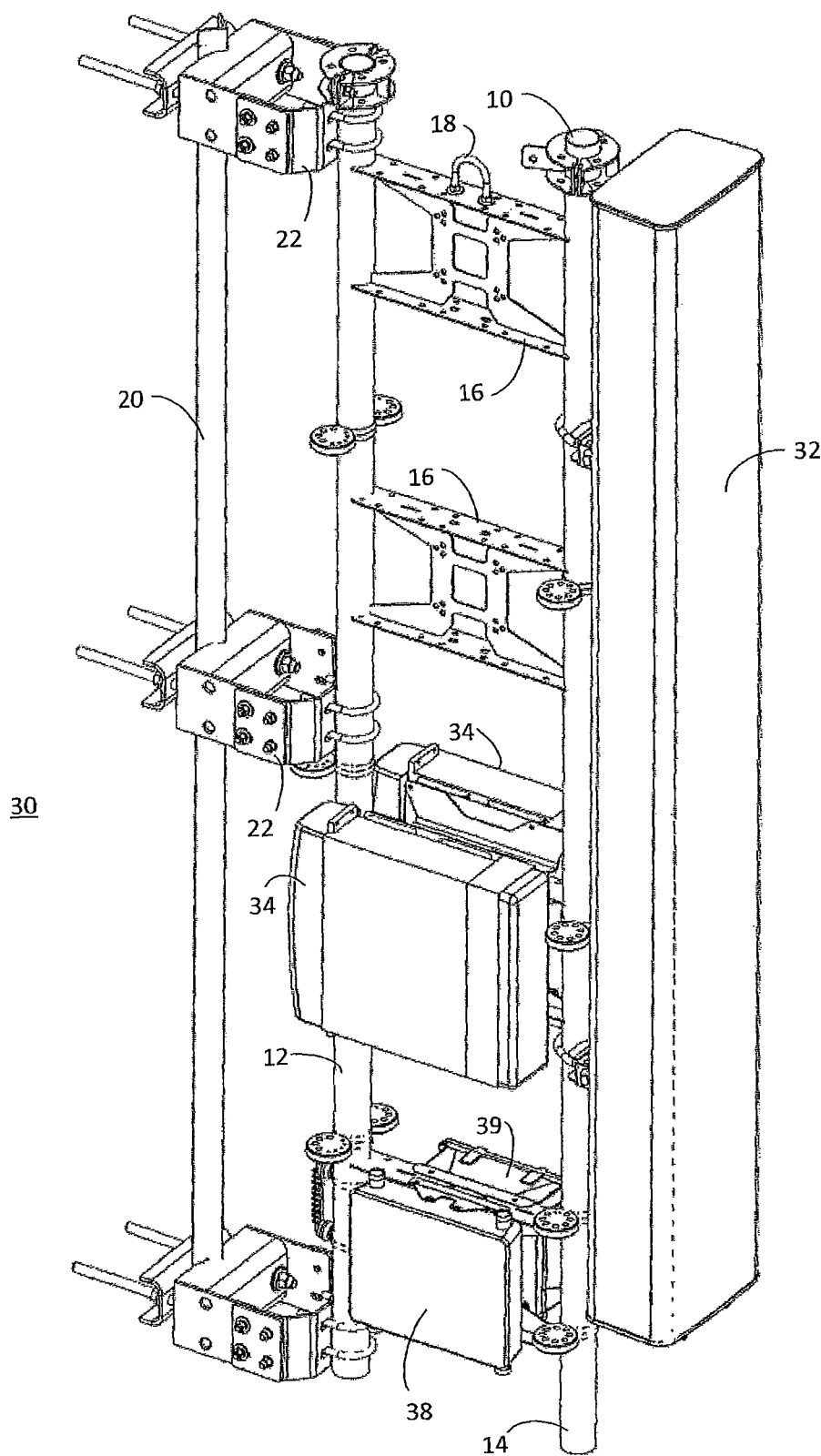
FIG. 5 is a perspective view of the cell sector radio assembly of FIG. 4.

Referring to FIGS. 4 and 5, a cell sector radio assembly 30 according to one example of the invention is illustrated. The cell sector radio assembly 30 includes an antenna 32 and remote radio heads 34 installed on the mounting frame 10. Antenna brackets 36 are attached to pipe 14 with U-bolts 24. The antenna 32 is then attached to the antenna brackets 36. The remote radio heads 34 are each mounted to the mounting frame 10 by the equipment mounts 16. In FIG. 5, a RF filter 38 is installed opposite from fiber and power distribution unit 39 on another equipment mount 16. Additional tower-mounted equipment may also be mounted on the mounting frame 10. A cell sector radio assembly further includes RF cables 26 coupling the remote radio unit 34 to the RF filter 38, and the RF filter 38 to antenna 32.

Figure 6:
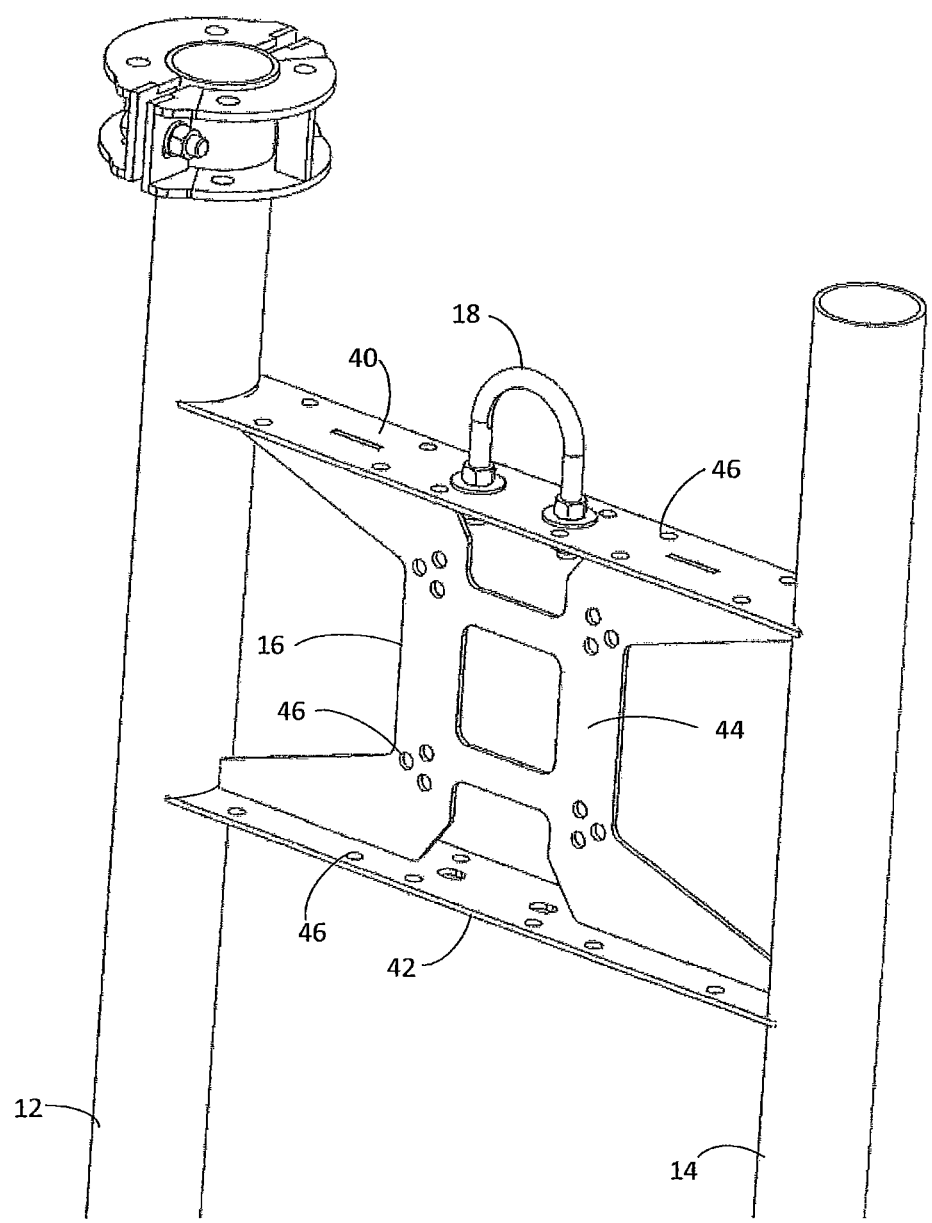
FIG. 6 is a perspective view of a portion of the mounting frame of FIG. 1.
Figure 7:
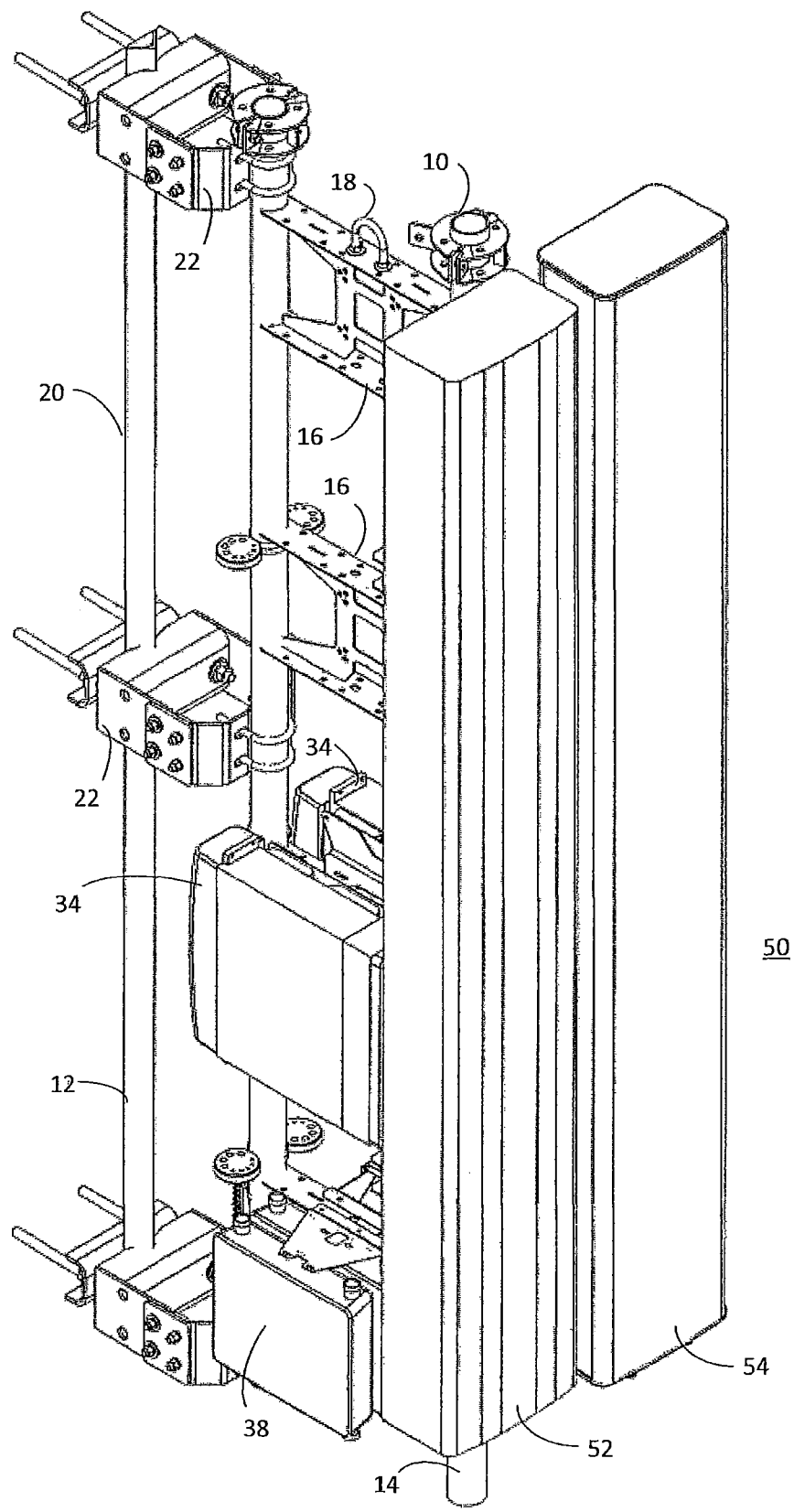
FIG. 7 is a perspective view of a second example of a cell sector radio assembly including the mounting frame of FIG. 1.
Figure 8:
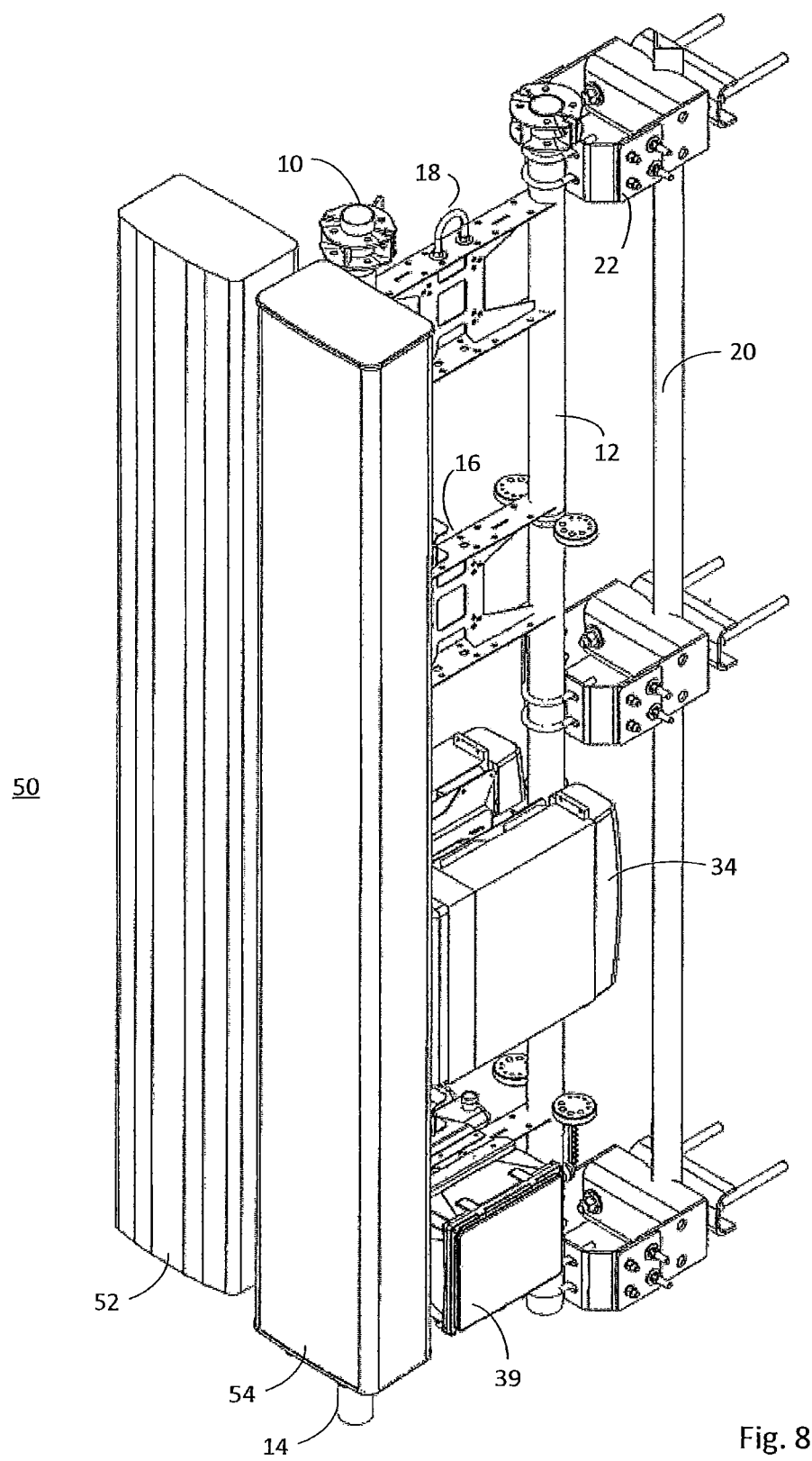
FIG. 8 is an alternate perspective view of the cell sector radio assembly of FIG. 7.
Figure 9:
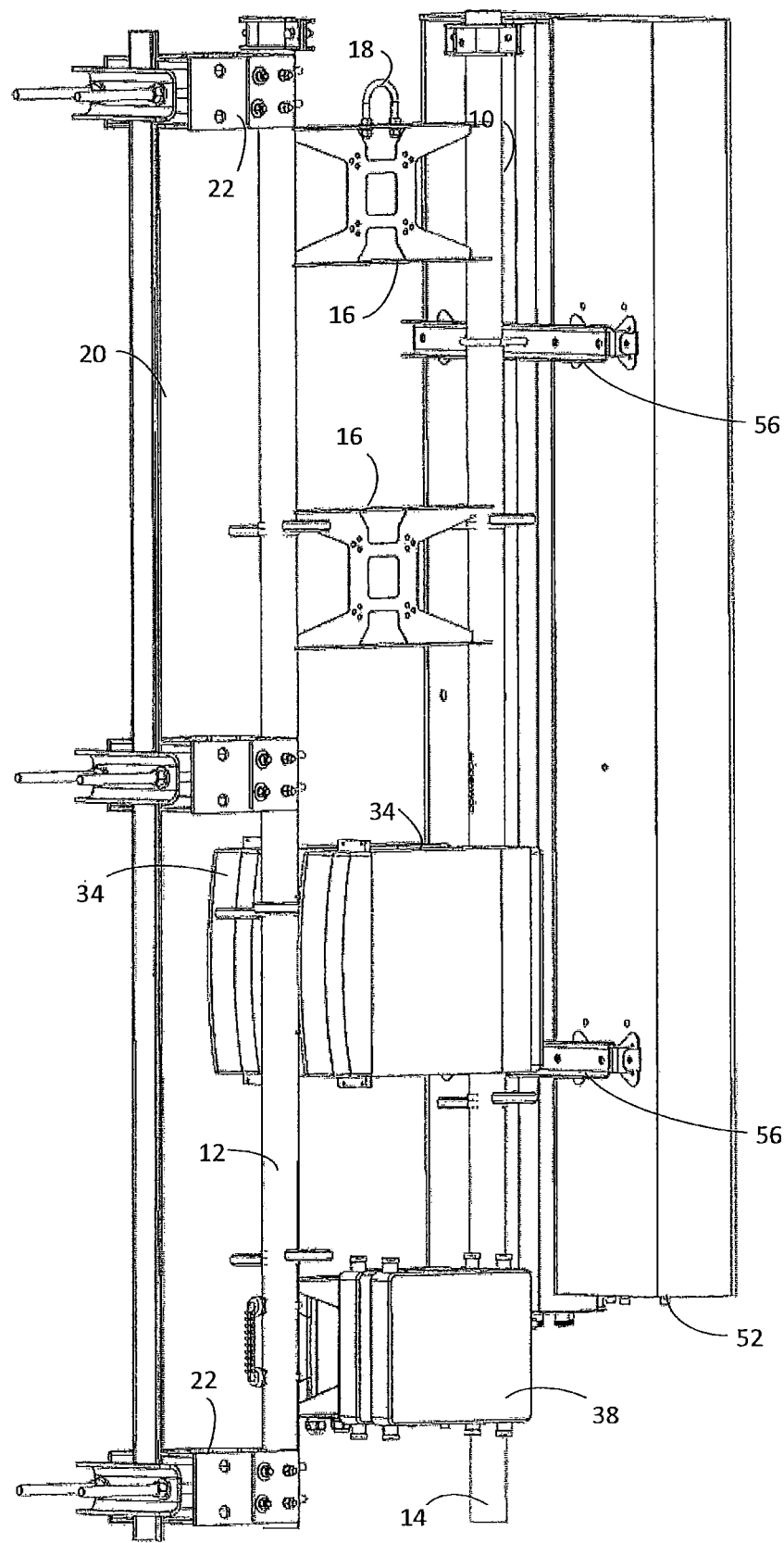
FIG. 9 is another alternate perspective view of the cell sector radio assembly of FIG. 7.

Referring to FIG. 6, additional details of the equipment mount 16 and lifting eye 18 are illustrated. The equipment mount 16 has a top bar 40, a bottom bar 42, and a vertical web 44 welded to the top bar 40 and bottom bar 42. A variety of holes 46 are located in predetermined locations to accommodate a variety of tower-mounted equipment and bracketry. The holes do not need to be threaded. Threaded clips may be attached to the equipment mounting position holes that are to be used by a given item of equipment and/or its mounting bracket. The lifting eye 18 may comprise a U-bolt which is connected to equipment mount 16 by threaded fasteners. Alternatively, the lifting eye 18 may be welded on to equipment mount 16. Fore and aft location is set to maintain balance of the full cell sector radio assembly 30 while hoisting the complete assembly. For example, the lifting eye 18 may be located close to the center of gravity of the cell sector radio assembly so that the assembly hangs and lifts straight, thereby reducing the risk of potentially damaging contact with the tower. The inclusion of such a lifting eye 18 reduces risk to fragile antenna and radio equipment.

Figure 10:
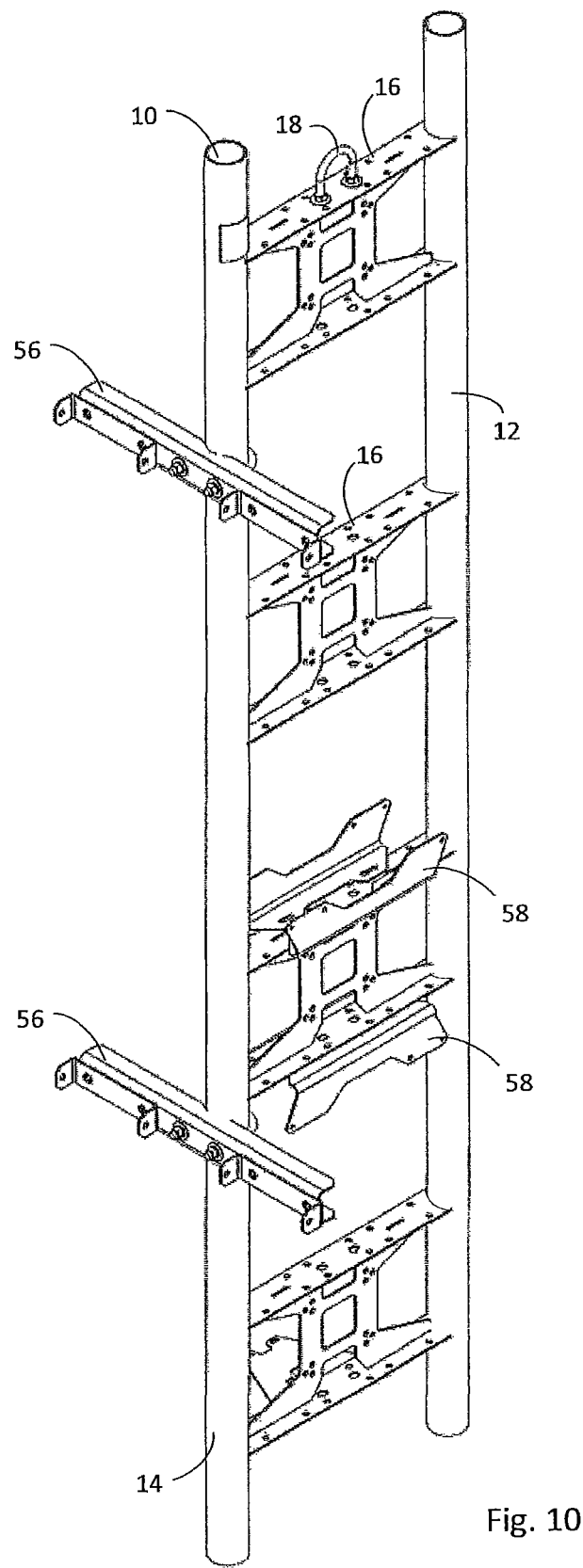
FIG. 10 is a perspective view of the mounting frame as implemented in FIGS. 7-9 with additional brackets.

Referring to FIGS. 7-10, a tower mounted cell sector radio assembly 50 may be equipped with two antennas 52, 54. Two antennas 52, 54 may provide for receive diversity, or multiple carriers, or additional capacity through additional RF bands. Referring to FIG. 10, in this example, a pair of horizontal mounting frames 56 are attached to pipe 12 of the mounting frame 10. The horizontal mounting frames 56 are configured to accept antenna mounting brackets 22. Also illustrated are adapter brackets 58 attached to an equipment mount 16. The adapter brackets 58 facilitate the attachment of remote radio heads 34.

The mounting frame 10 allows a full cell sector radio assembly 30, 50 to be pre-assembled and tested before hoisting and mounting on a tower location. As used herein, a cell sector radio assembly 30, 50 generally includes the mounting frame 10, at least one cell sector antenna 32 mounted to the mounting frame 10, at least one remote radio head 34 mounted to an equipment mount 16 of the mounting frame 10, and appropriate RF cabling connecting the remote radio head 34 to the sector antenna 32. As illustrated in the various embodiments, a cell sector radio assembly 30, 50 may further comprise one or more filters, additional antennas, fiber and power distribution equipment, and/or one or more diplexers.

Figure 11A:
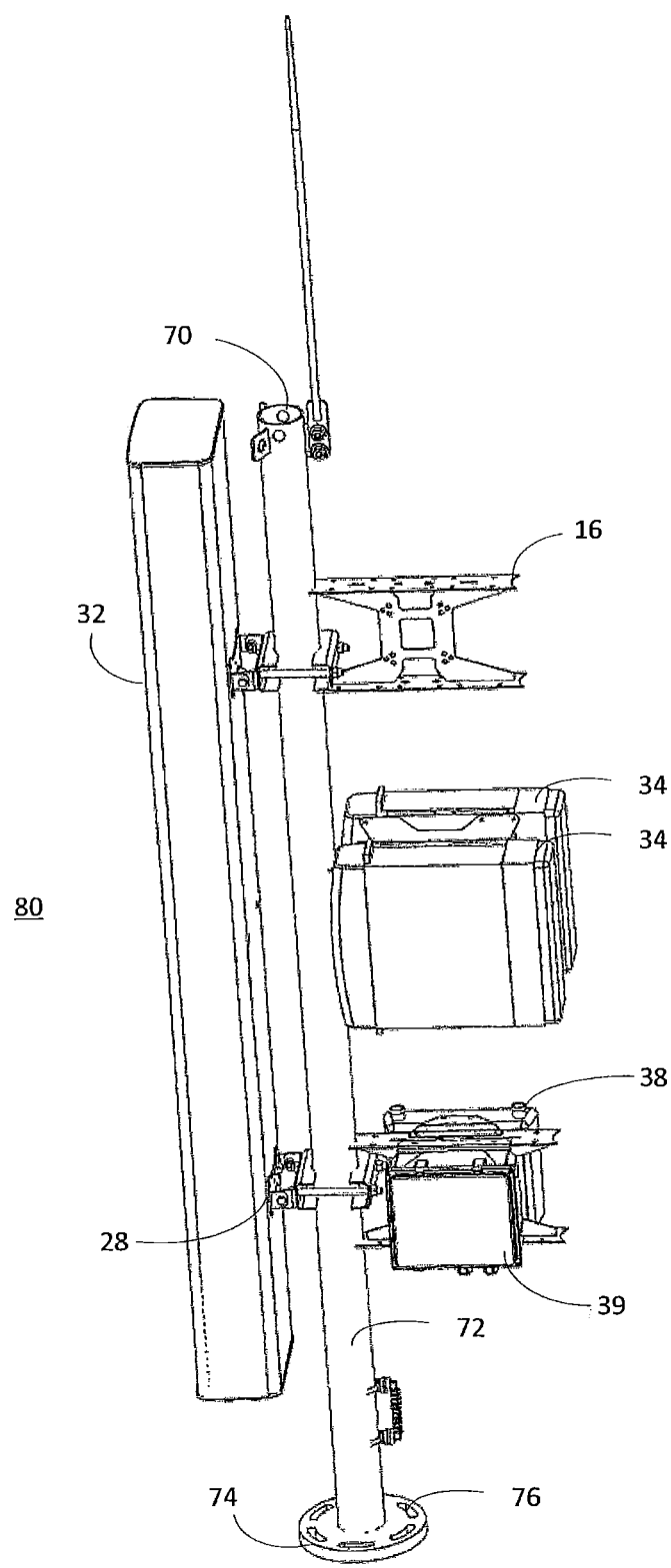
FIG. 11a is a perspective view of a third example of a cell sector radio assembly, adapted for rooftop applications.
Figure 11B:
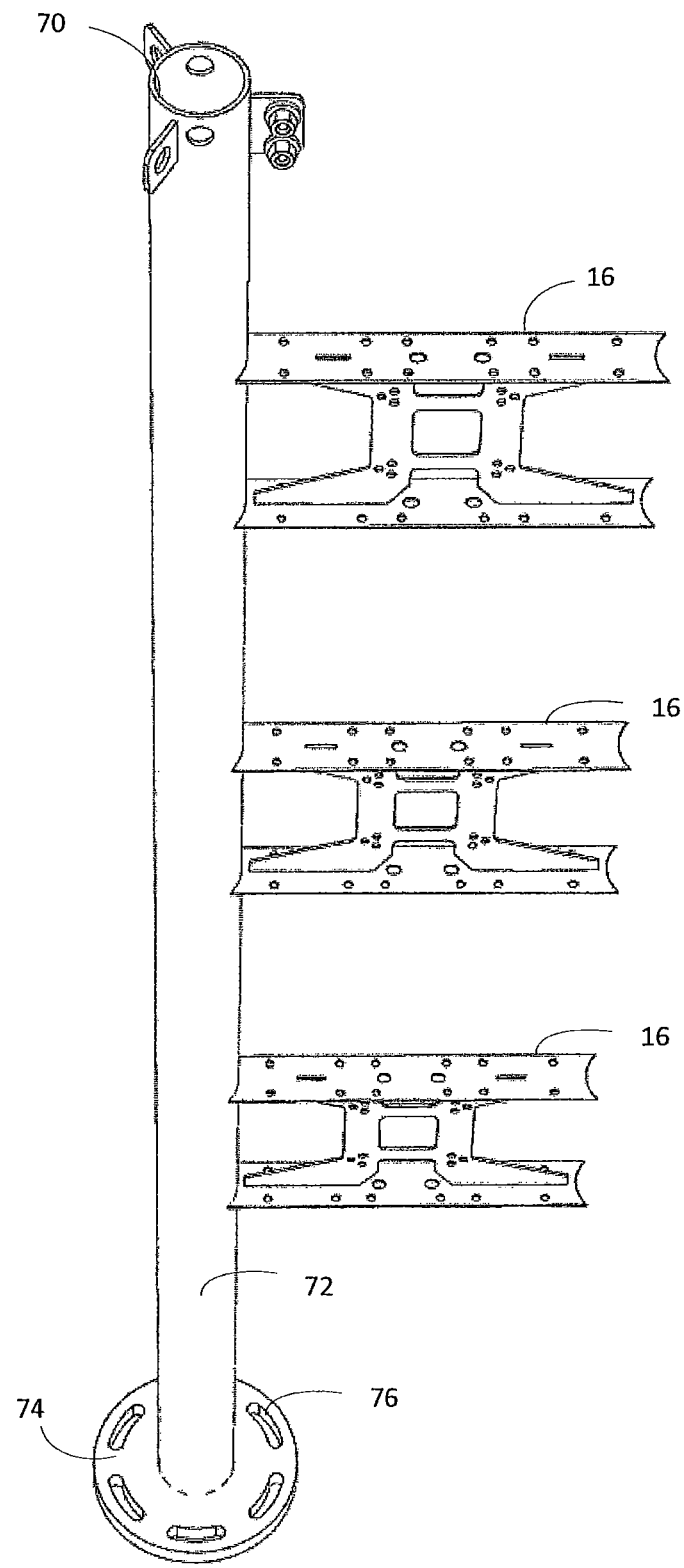

The mounting frame structure may be applied to multiple field deployment configurations, including tower mounting, rooftop mounting and rooftop mounting with a remote antenna. An example of the invention suitable for rooftop installations is illustrated in FIGS. 11a and 11b. In this example, the mounting frame 70 comprises a single pole 72, a base flange 74 and a plurality of equipment mounts 16. The flange 74 includes slotted apertures 76. The slotted apertures 76 allow azimuth panning of the cell sector radio assembly with respect to a roof top mount. A torque bar may be included on the mounting frame to facilitate panning the cell sector radio assembly.

Antenna brackets 78 are attached to pole 72, and a cellular antenna 32 is mounted on the antenna brackets 78. Remote radio heads 34 are mounted on either side of a first equipment mount 16. A filter 38 and fiber/power termination unit 39 are attached to another equipment mount 16. The fiber/power termination unit 39 distributes power to each item of tower mounted equipment requiring it, and provides a fiber-optic backhaul demarcation point for the remote radio heads 34. The complete assembly comprises cell sector radio assembly 80.

Figure 12:
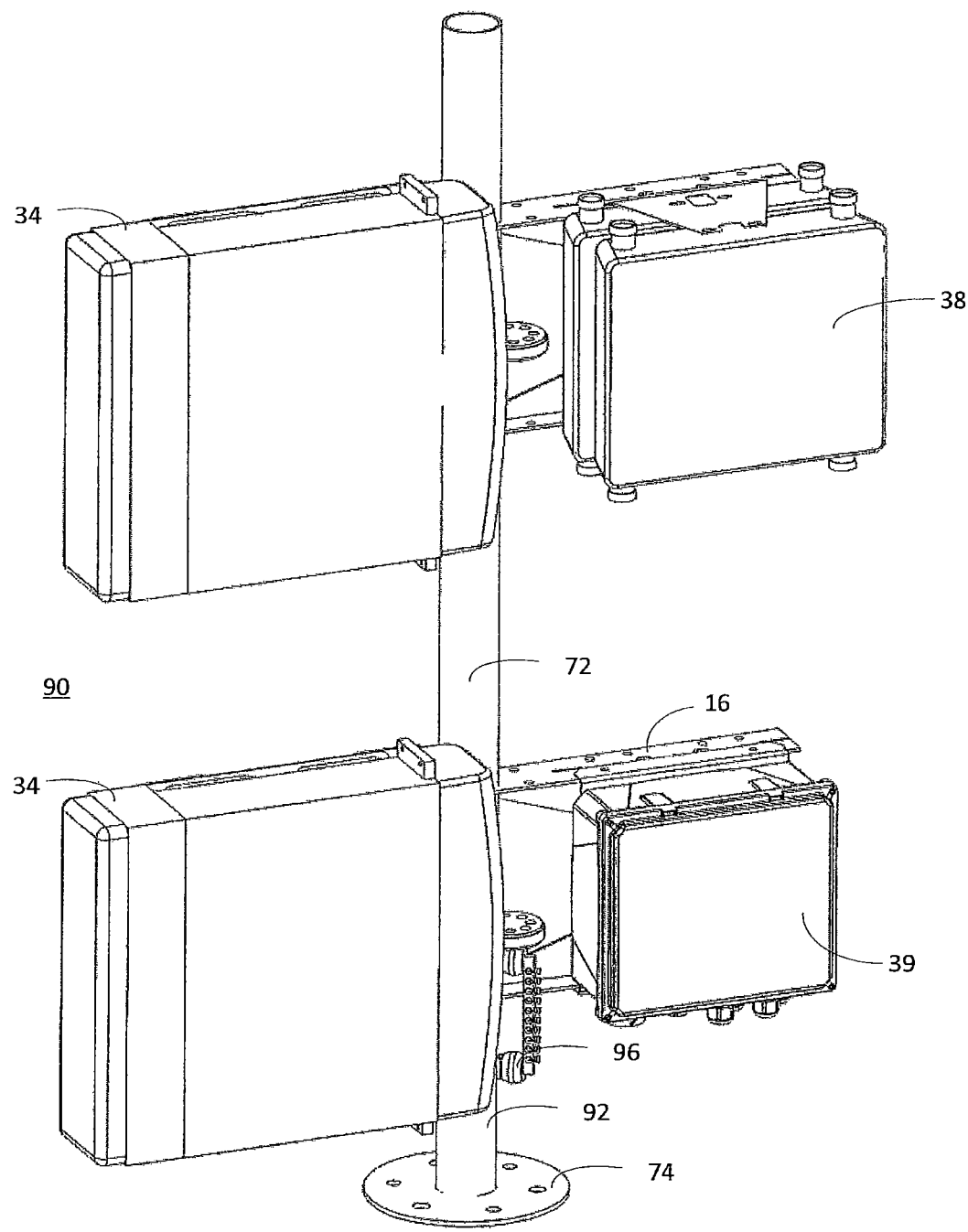
FIG. 12 is a perspective view of a fourth example of a cell sector radio assembly, also adapted for rooftop applications.
Figure 13:
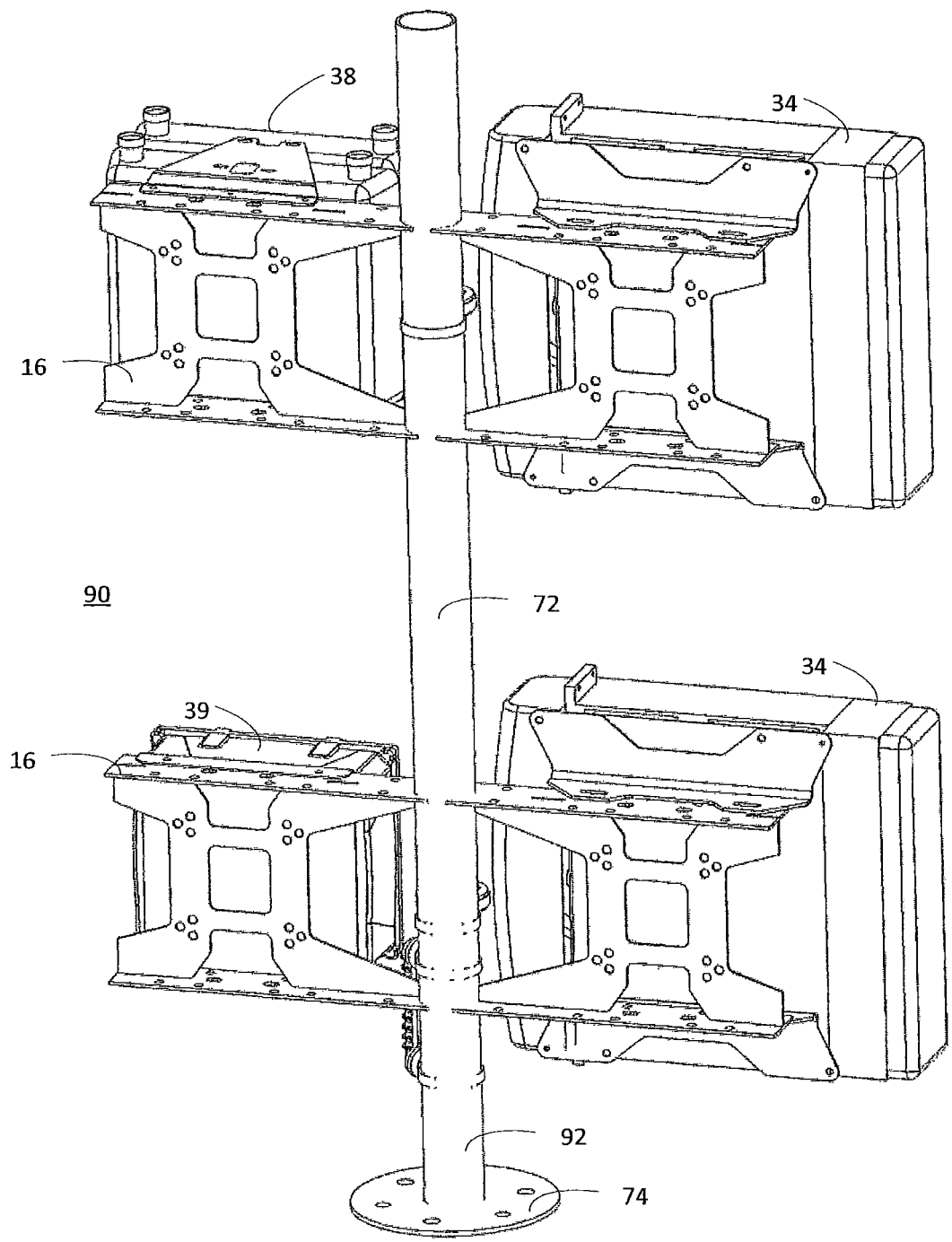
FIG. 13 is another alternate perspective view of the cell sector radio assembly of FIG. 12.
Figure 14:
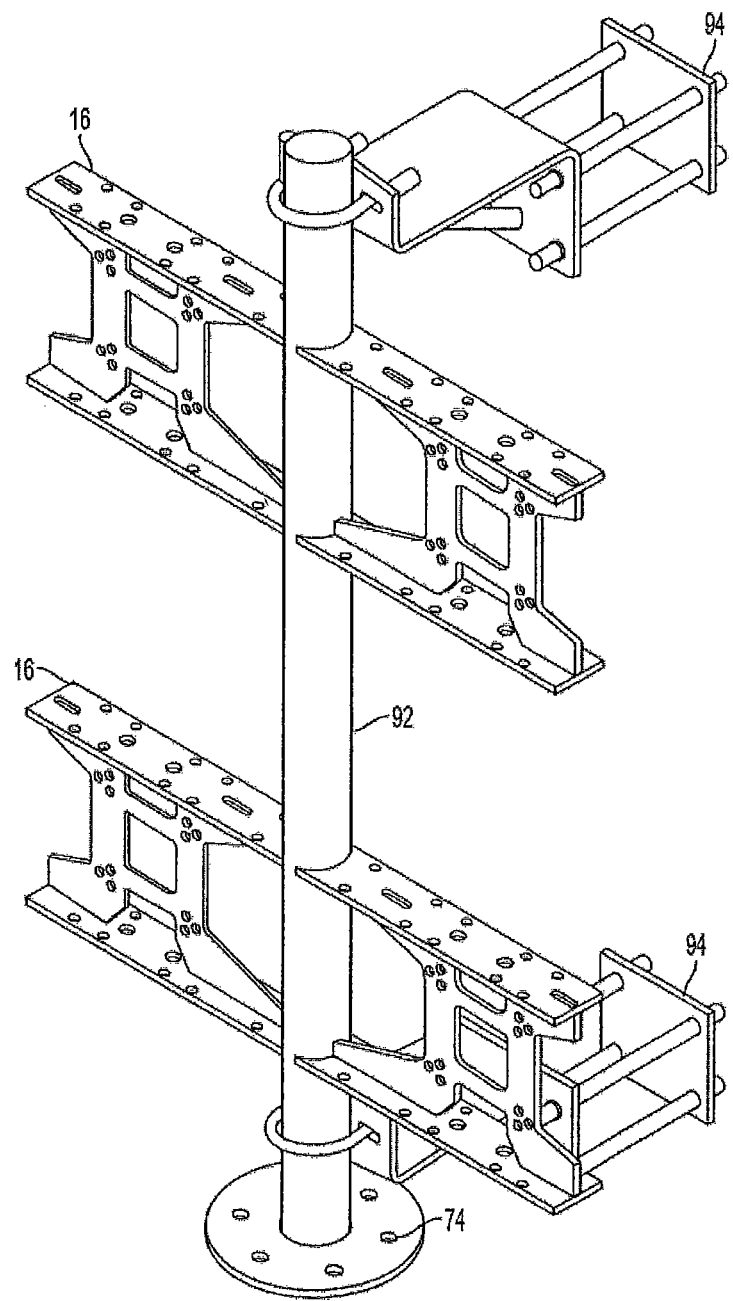
FIG. 14 is a perspective view of the mounting frame as implemented in FIGS. 12 and 13 with additional brackets.

In another example, a 1.5 meter cell sector radio assembly 90 is illustrated in FIGS. 12-14. Cell sector radio assembly 90 comprises a mounting frame 92, remote radio heads 34, filter 38, and a fiber/power termination 39. The mounting frame 92 comprises a single pole 72 with a flange 74. A plurality of equipment mounts 16 are welded to pole 72. The equipment mounts are welded opposite of each other to reduce the height of the mounting frame 92. The mounting frame 92 may also include a ground bar. Antenna brackets 94 may be attached to the pole 72 by U-bolts, as illustrated in FIG. 14.

As noted above, the equipment mounts 16 are oriented opposite each other. Accordingly, the remote radio heads 34 are located opposite the filters 38/other electronics, thereby reducing the overall height of cell sector radio assembly 90. The cell sector radio assembly 90 may be easily lifted and moved through a building, including fitting into a conventional elevator. This enables an installation crew to locate the cell sector radio assembly on the roof off a building without the use or expense of a crane or helicopter. Additionally, the mounting frame may be configured so as to optimize shipping. For example, the mounting frame, and the location of components attached to the mounting frame, may be configured so that when the cell sector radio assembly is loaded into its shipping crate, the shipping crates are dimensioned to make the maximum use of commercial shipping containers.

In a preferred embodiment, the cell sector radio assembly is assembled in a factory and fully tested as an integrated solution prior to shipping to the cell site. In this example, all mounting and interconnections made in controlled factory environment instead of field or warehouse. Connectors may be sealed at the factory with a slide-on weather boot. All optical and RF performance criteria may be tested and verified in the factory prior to shipping. This ensures that the cabling is connected to the proper terminals and that the connections are sufficiently clean to meet performance requirements. Contaminated connections may result in unsatisfactory levels of passive intermodulation (PIM).

Another advantage of factory assembly is that the configuration may be fully tested and characterized prior to installation. Installation may comprise as little as attaching the cell sector radio assembly to a mounting location on a tower or pole, setting mechanical downtilt angle, setting a mechanical azimuth angle, and connecting the backhaul and power. This reduces the amount of time required by service personnel in the field.

While making and testing a full cell sector radio assembly in the factory has certain advantages regarding improved performance and reduced installation time, such a process also poses certain additional considerations. For example, referring to FIG. 17, the remote radio heads 34, filters 38, backhaul/power termination units 39 and sector antennas 52, 54 have been removed from their original protective shipping packaging. Additionally, RF cables 26 are installed and the assembly is fully tested to ensure proper RF connections. The cabling is exposed, and may be damaged by handling the cell sector radio assemblies described above improperly. Accordingly, one aspect of the present invention involves strategically designed packaging to ensure reliable transport of a pre-assembled, pre-tested cell sector radio assembly.

Figure 15:
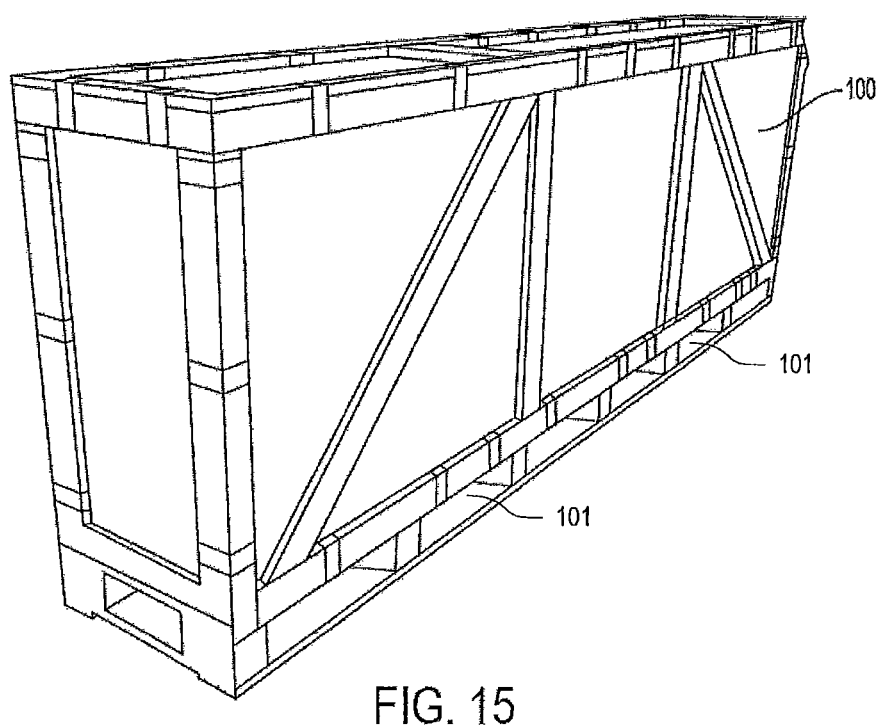
FIG. 15 is an illustration of a shipping crate for use with a cell sector radio assembly according to the present invention.
Figure 16:
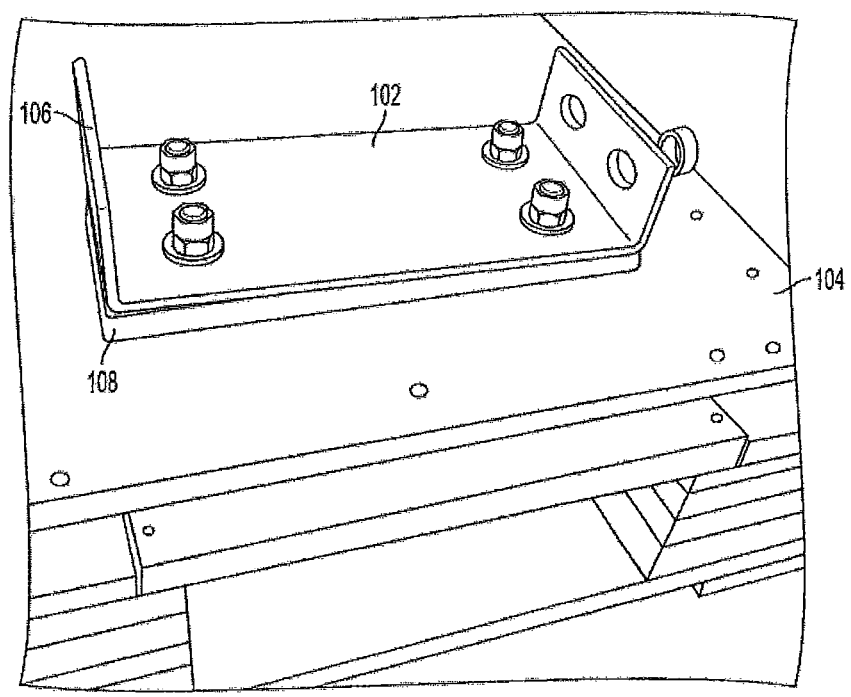
FIG. 16 is an illustration of a mounting location on a base of the shipping crate of FIG. 15 according to another aspect of the invention.

Referring to FIG. 15 a shipping crate 100 is illustrated. The shipping crate 100 includes integral lift points 101 for lifting of the crate. Referring to FIG. 16, in another aspect of the present invention, mounting locations 102 may be provided on a base 104 of the shipping crate 100. In a preferred example, the mounting locations 102 comprise a bracket 106 fastened to the base 104 and an elastomeric material 108 between the bracket 106 and the base 104. The elastomeric material reduces vibration and shock loads that would otherwise be transmitted from the shipping crate to the cell sector radio assembly.

Figure 17:
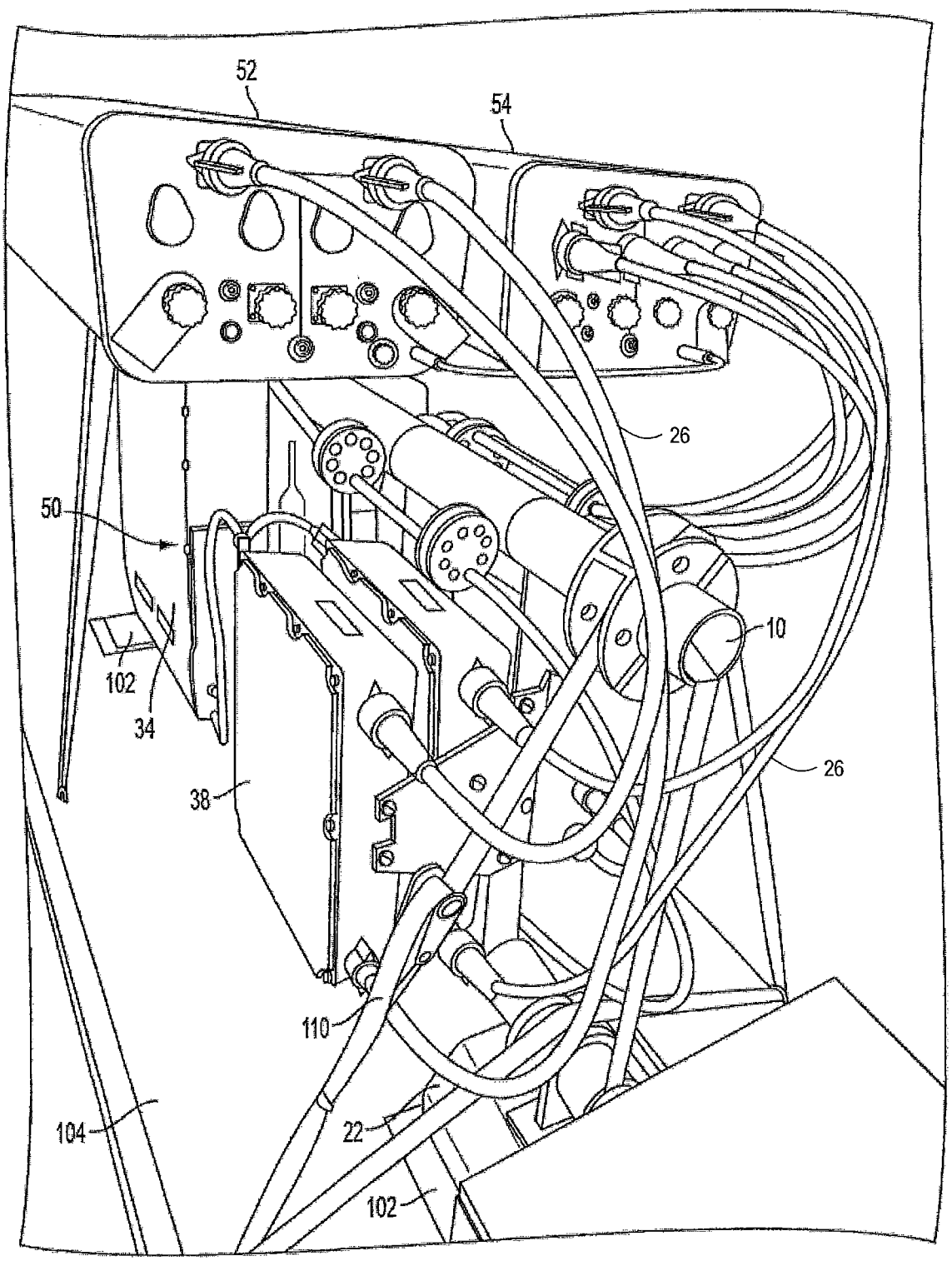
FIG. 17 is an illustration of a cell sector radio assembly mounted on the base of a shipping crate prior to transportation according to another aspect of the invention.

Referring to FIG. 17, a cell sector radio assembly 50 is mounted on the base 104 of the shipping crate 100 prior to shipment. While mounting brackets 22 are intended for attaching the cell sector radio assembly 50 to the cell tower mounting structure 20, during shipping, the mounting brackets 22 may be advantageously fastened to mounting locations 102 on the base 104 of the shipping crate 100. Straps 110 further secure the cell sector radio assembly 50 to the base 104 of the crate 100.

During installation, once the cell sector radio assembly 30, 50 is mechanically mounted and oriented, optical fiber backhaul and power connections may be made. In several of the illustrated examples, a fiber and power distribution unit 39 is included in the cell sector radio assembly. Other commonly used backhaul technologies may be used in place of the optical fiber terminations. To achieve "plug-and-play" operation, a factory pre-assembled, pre-wired ground based cabinet with external I/O connector to mate with trunk cable may be provided. In this case, a factory pre-assembled, pre-wired tower mounted sector with external I/O connector to mate with trunk cable may also be provided. For example, a hybrid trunk cable (fiber/copper) with connectorized ends to make connection from ground cabinet to tower mounted sector may be provided.

The several embodiments of cell sector radio assemblies and their components described herein and/or shown in the drawings are presented by way of example only and are not limiting as to the scope of the invention. Unless otherwise specifically stated, individual aspects and components of the cell sector radio assemblies may be modified without departing from the scope and spirit of the invention.

What is claimed is:

1. A pre-assembled cell sector radio assembly, comprising:
   a frame, the frame comprising:
      a first vertical frame element;
      a second vertical frame element;
      at least one equipment mount disposed between the first vertical frame element and the second vertical frame element, wherein the at least one equipment mount has an elongate top bar, an elongate bottom bar, and an elongate vertical web, wherein the vertical web comprises first and second portions welded to the top bar and third and fourth portions welded to the bottom bar, wherein the first and second portions are spaced apart from each other such that the vertical web has an upper free edge between the first and second portions, and wherein the third and fourth portions are spaced apart from each other such that the vertical web has a lower free edge between the third and fourth portions, wherein the upper free edge and the lower free edge are parallel and spaced apart by at least an opening in the vertical web, and wherein the at least one equipment mount is welded to the first and second vertical frame elements;
   at least one cellular base station antenna mounted on the frame;
   at least one cellular radio mounted on the at least one equipment mount; and
   RF cables connecting the cellular radio to the cellular base station antenna.

2. The pre-assembled cell sector radio assembly of claim 1, wherein the at least one equipment mount is a plurality of equipment mounts.

3. The pre-assembled cell sector radio assembly of claim 1, further comprising a backhaul termination and power distribution unit mounted on the at least one equipment mount.

4. The pre-assembled cell sector radio assembly of claim 1 further comprising a filter unit mounted on the at least one equipment mount.

5. A frame for a cell sector radio assembly, comprising:
a first vertical frame element;
a second vertical frame element;
a plurality of vertically spaced equipment mounts disposed between the first vertical frame element and the second vertical frame element, wherein each equipment mount has an elongate top bar, an elongate bottom bar, and an elongate vertical web, wherein the vertical web comprises first and second portions welded to the top bar and third and fourth portions welded to the bottom bar, wherein the first and second portions are spaced apart from each other such that the vertical web has an upper free edge between the first and second portions, and wherein the third and fourth portions are spaced apart from each other such that the vertical web has a lower free edge between the third and fourth portions, wherein the upper free edge and the lower free edge are parallel and spaced apart by at least an opening in the vertical web, and wherein each equipment mount is welded to the first and second vertical frame elements; and
adjustable tower mounting brackets disposed on the first frame element.

6. The frame defined in claim 5, further comprising:
at least one cellular base station antenna mounted on the frame;
at least one cellular radio, mounted on the frame;
RF cables coupling the cellular radio to the cellular base station antenna.

7. The frame defined in claim 5, wherein the vertical web upper free edge is spaced apart from and parallel with the top bar and the lower free edge is spaced apart from and parallel with the bottom bar.

8. The frame defined in claim 5, wherein the first and second frame elements are pipes.

9. The frame defined in claim 5, wherein the vertical web comprises a first side free edge between the first and fourth portions, and an opposite second side free edge between the second and third portions, wherein the first side free edge and the second side free edge are parallel.

10. The frame defined in claim 5, wherein a plurality of equipment mounting holes are located in the top bar, the bottom bar, and the vertical web at predetermined locations of each equipment mount.

* * * * *